United States Patent
Yamaoka et al.

(10) Patent No.: US 8,298,502 B2
(45) Date of Patent: Oct. 30, 2012

(54) PREPARATION METHOD OF LITHIUM CARBONATE FROM LITHIUM-ION SECONDARY BATTERY RECOVERED MATERIAL

(75) Inventors: Toshiyuki Yamaoka, Hitachi (JP); Naoki Higuchi, Hitachi (JP); Makoto Narisako, Hitachi (JP); Daisuke Kobayashi, Hitachi (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 48 days.

(21) Appl. No.: 12/829,440

(22) Filed: Jul. 2, 2010

(65) Prior Publication Data
US 2011/0002825 A1 Jan. 6, 2011

(30) Foreign Application Priority Data
Jul. 6, 2009 (JP) .................. 2009-159576

(51) Int. Cl.
C01D 3/08 (2006.01)
C01D 15/00 (2006.01)
(52) U.S. Cl. .............. 423/179; 423/179.5; 423/181; 423/184; 423/186; 423/189
(58) Field of Classification Search ............... 423/179, 423/179.5, 181, 184, 186, 189
See application file for complete search history.

(56) References Cited

U.S. PATENT DOCUMENTS
5,198,081 A    3/1993  Kanoh et al.

FOREIGN PATENT DOCUMENTS
| JP | 6-88277 A | 3/1994 |
| JP | 2005-26089 A | 1/2005 |
| JP | 2006-57142 A | 3/2006 |
| JP | 2007-122885 A | 5/2007 |
| JP | 2007122885 A | * 5/2007 |

OTHER PUBLICATIONS

European Search Report in corresponding European Application No. EP 10168438.9 mailed Oct. 6, 2010.
Xu et al., "A review of processes and technologies for the recycling of lithium-ion secondary batteries," Journal of Power Sources, vol. 177, No. 2, Jan. 14, 2008, pp. 512-527, XP022450299.
Zhang et al., "Hydrometallurgical process for recovery of metal values from spent lithium-ion secondary batteries," Hydrometallurgy, vol. 47, Jan. 1, 1998, pp. 259-271, XP002928037.

* cited by examiner

*Primary Examiner* — Melvin C Mayes
*Assistant Examiner* — Melissa Stalder
(74) *Attorney, Agent, or Firm* — Birch, Stewart, Kolasch & Birch, LLP

(57) ABSTRACT

A preparation method of lithium carbonate, in recovering valuable resources of a lithium-ion battery, reducing impurities from lithium carbonate, having a pretreatment process, comprising:
a first step cleaning an organic phase containing nickel and lithium prepared by a solvent extraction by use of a sulfuric acid solution containing nickel and enriching lithium in the cleaning solution;
a second step extracting a residual nickel only by an organic solvent from a post-cleaning solution in which the lithium is enriched; and
a third step controlling pH of the post-extraction solution containing the lithium by ammonia water or lithium hydroxide.

8 Claims, 2 Drawing Sheets

Ni, Li partition coefficient in each pH by VA-10

PREPARATION METHOD OF LITHIUM CARBONATE FROM LITHIUM-ION SECONDARY BATTERY RECOVERED MATERIAL

TECHNICAL FIELD OF THE INVENTION

The present invention relates to a method of recovering a valuable metal from a main body of used lithium-ion secondary battery, and more specifically, a method of extracting nickel and lithium by a solvent extraction from a solution produced in treating a positive electrode material contained in the lithium-ion secondary battery, cleaning them, separating nickel from lithium by a solvent extraction from a post-cleaning solution, and then recovering lithium.

BACKGROUND OF THE INVENTION

An application of a lithium-ion secondary battery rapidly broadens as a battery for a hybrid car. Further, it is prospective that a production volume of a large-size lithium-ion secondary battery would increase at a great rate because a capacity of its unit becomes large. Manganese, cobalt, nickel and lithium are used as positive electrode materials of the lithium-ion secondary battery. However, it is hard to say that their recovering method is established at present. Among them, though lithium is an essential element of the current lithium-ion secondary battery, its recover is hardly conducted at all. It is obvious that an amount of emergence of waste lithium-ion battery increases along with the popularization of a battery car and the like, and the recover of lithium would be important.

There is a method as disclosed in Japanese Patent Application Laid-open Publication No. 06-88277 (Patent document 1) as one of the recovering method of lithium. It is suitable for recovering lithium from diluted lithium solution. However, it cannot be used for a high concentration solution provided in separating each element from a lithium-ion waste battery.

There is a method as disclosed in Japanese Patent Application Laid-open Publication No. 2006-57142 (Patent document 2). Lithium is extracted by an acid system solvent extraction agent from a solution containing a low concentration lithium ion, then a reverse extraction is conducted, and then lithium is recovered from the provided solution in a form of carbonate in the method. However, an extraction rate of lithium in the solvent extraction is low, namely 50%, and a recovering rate of lithium of the total is low.

A method as disclosed in Japanese Patent Application Laid-open Publication No. 2005-26089 (Patent document 3) is a method for recovering lithium from waste lithium-ion battery in a form of carbonate. However, in the method, an increase of an equipment cost and a manipulatory vexatiousness cannot be evaded because lithium containing solution and $CO_2$ gas are contacted in a pressure container when carbonate is produced.

(Patent documents 1) Japanese Patent Application Laid-open Publication No. 06-88277 (A method for recovering lithium and electrode used in the method)

(Patent documents 2) Japanese Patent Application Laid-open Publication No. 2006-57142 (A method for recovering lithium)

(Patent documents 3) Japanese Patent Application Laid-open Publication No. 2005-26089 (Lithium battery, a method for preparation and treatment thereof)

SUMMARY OF THE INVENTION

The present inventions solve the above problem, and the inventions provide a method of recovering lithium as lithium carbonate from solution containing nickel and lithium which are lithium-ion secondary battery recovered materials.

The present inventions solve the above problem and are as follows.

(1) A preparation method of lithium carbonate, in recovering valuable resources of a lithium-ion battery, reducing impurities from lithium carbonate, having a pretreatment process, comprising:

a first step cleaning an organic phase containing nickel and lithium prepared by a solvent extraction by use of a sulfuric acid solution containing nickel and enriching lithium in the cleaning solution;

a second step extracting a residual nickel only by an organic solvent from a post-cleaning solution in which the lithium is enriched; and a third step controlling pH of the post-extraction solution containing the lithium by ammonia water or lithium hydroxide.

(2) The preparation method of (1), after the third step, comprising:

a fourth step producing lithium carbonate by injecting carbon dioxide gas or adding other carbonation agents, and controlling decreasing pH by ammonia water; and a fifth step cleaning the produced lithium carbonate.

(3) The preparation method of (1), wherein the organic solvent used in the second step is a carboxylic acid system extract agent.

(4) The preparation method of (1), wherein an equilibrium pH in cleaning the organic phase containing nickel and lithium in the first step by the sulfuric acid solution containing nickel is 2 to 4.

(5) The preparation method of (2), controlling a carbonation pH for lithium in the fourth step to 8 to 11.

(6) The preparation method of (2), wherein the lithium carbonate is cleaned at 60 to 95° C. in the fifth step.

(7) The preparation method of (1), wherein a concentration of sodium in the produced lithium carbonate is less or equal to 700 mass ppm.

By conducting the above preparation method of lithium carbonate, the following advantages are provided.

(1) By cleaning an organic phase containing nickel and lithium prepared by use of a sulfuric acid solution containing nickel, nickel and lithium in the organic phase can be separated roughly and a concentration of lithium can be enriched to a level in which lithium can be recovered as lithium carbonate.

(2) Nickel in the cleaning solution of (1) can be separated efficiently and a solution of high concentration of lithium can be provided.

(3) By controlling pH of the solution of high concentration of lithium by ammonia water, in which nickel is separated, and by injecting carbon dioxide gas, sodium in the recovered lithium carbonate can be reduced as much as possible.

(4) The higher a temperature of water is, the smaller a solubility of lithium carbonate to water is. Therefore, by cleaning the recovered lithium carbonate by use of hot water, a loss of lithium carbonate can be reduced in removing attached impurities.

DESCRIPTION OF THE PREFERRED EMBODIMENTS

Figure 1:
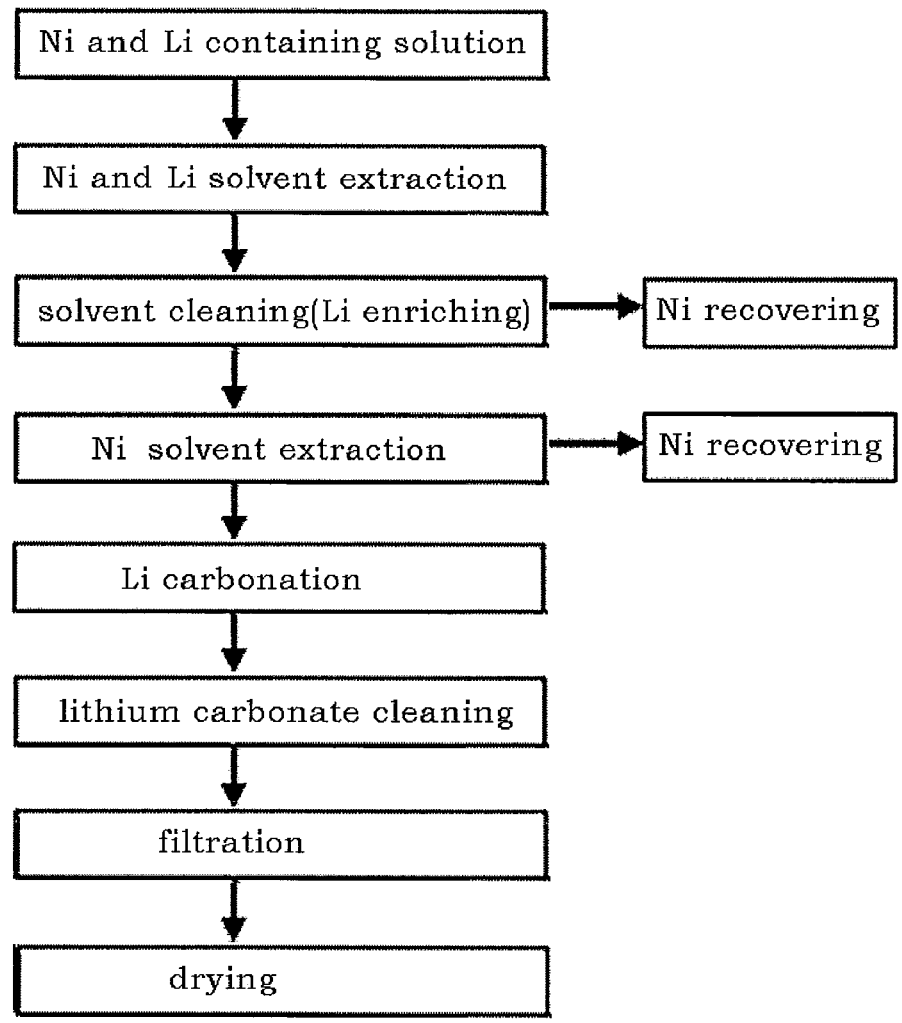
FIG. 1 indicates a process flow chart of one embodiment of the present invention.

FIG. 1 is shown as a basic process flow chart of one embodiment of the present invention. The detailed explanation of the present invention is as follows.

A processing object solution of the present invention is an organic solvent containing nickel and lithium prepared by a solvent extraction. This is provided in separating and recovering manganese, cobalt, nickel and lithium from a solution provided after unbuilding and solving a used lithium-ion secondary battery and a waste cathode active material in the process of manufacturing the lithium-ion secondary battery.

First Step (Cleaning Step of the Organic Phase Containing Nickel and Lithium)

With regard to extract agents and dilution agents, any kind of them can be used for the organic phase containing nickel and lithium. Generally, 2-ethylhexylphosphonic acid-mono-2-ethylhexylester or di(2-ethylhexyl) phosphoric acid are used.

The organic phase in which nickel and lithium are extracted is agitated with sulfuric acid solution containing nickel in which pH is controlled, and lithium in the organic phase is transferred to the sulfuric acid solution containing nickel. By using the cleaning solution repeatedly, a concentration of lithium in the cleaning solution increases and lithium can be enriched.

The equilibrium pH in the cleaning is preferably 2 to 4. If pH is lower than that, in addition to lithium, nickel also transfers to the cleaning solution and an amount of the extract agent used in extracting nickel in the second step. If pH is higher than that, lithium does not transfer sufficiently to the aqueous phase and the concentration of lithium in the cleaning solution does not increase sufficiently. Lithium decreases and nickel increases in the cleaned organic phase. Therefore, the organic phase is used in a recovering step of nickel by an appropriate treatment such as reverse extraction.

Second Step (Separation Step of Nickel and Lithium from the Cleaning Solution)

An organic solvent is used as an extract agent of nickel from the cleaning solution provided in the first step. For example, carboxylic acid is used as the organic solvent. A solvent controlled by diluting the extract agent in a carbon hydride system agent and the cleaning solution containing nickel and lithium are mixed and then a solvent extraction of nickel is conducted.

The equilibrium pH in the extracting nickel is preferably 6 to 8. If pH is higher than that, lithium is extracted in the organic phase and the concentration of lithium in the aqueous phase decreases. If pH is lower than that, an amount of nickel extracted to the organic phase decreases and nickel in the aqueous phase cannot be separated sufficiently. The extraction of nickel is conducted more preferable at equilibrium pH 7 to 7.5.

Third Step (Neutralizing Step)

In extracting nickel, pH of the solution decreases because a hydrogen ion is released from the extract agent. Accordingly, the extraction of nickel is conducted with maintaining pH by adding an alkaline agent. The alkaline agent for use is ammonia water or lithium hydroxide. It prevents impurities such as Na from getting mixed in with lithium carbonate which is a manufactured article before happens.

Fourth Step (Lithium Carbonation Step)

In this step, after adding an alkaline agent to the solution containing lithium in which nickel is separated, lithium carbonate is precipitated and recovered by injecting carbon dioxide gas or adding carbonation agent.

Ammonia water is used as the alkaline agent. By controlling pH of the solution to 8 to 11 when carbon dioxide gas is injected or carbonation agent is added, lithium carbonate is produced efficiently.

Further, when carbon dioxide gas is injected, pH of the solution decreases with producing lithium carbonate. Therefore, by adding ammonia water accordingly to the solution and maintaining pH of the solution at the carbonation to 8 to 11, a recovering rate for lithium can be improved.

Fifth Step (Cleaning Step for Lithium Carbonate)

In this step, after filtrating lithium carbonate produced in the fourth step, lithium carbonate is cleaned by hot water and impurities elements attached to a surface of lithium carbonate are reduced.

If a temperature of hot water is higher, an effect of removing sodium in cleaning enhances more and the loss of lithium carbonate by solving can be reduced. Therefore, it is conducted preferably at 60 to 95° C.

EXAMPLES

Example 1

Example of the First Step (Cleaning Step of the Organic Phase Containing Nickel and Lithium)

A cathode active material for a lithium-ion secondary battery and valuable metals were solved by an appropriate method. Then manganese and cobalt were removed from the provided solution. Then the solution containing nickel and lithium were blended and agitated with a solvent in which 2-ethylhexylphosphonic acid-mono-2-ethylhexylester (DAIHACHI CHEMICAL INDUSTRY. Trade name: PC-88A) was diluted to 25 vol % by a naphthene system agent (SHELL CHEMICALS. Trade name: shellsolD70). Then nickel and lithium were extracted at the equilibrium pH 7.5 and the organic phase of the processing object of the present invention were prepared.

The organic phase containing nickel and lithium, provided by the above extraction, were blended and agitated with sulfuric acid nickel solution in which a concentration of nickel is 50 g/L and pH is controlled to 2 by a ratio of the organic phase/the aqueous phase being 1. Table 1 indicates an appearance of a change of the concentration of nickel and lithium in the cleaning solution when the operation was conducted repeatedly with changing the organic phase. It is understood by the result that nickel in the cleaning solution was substituted for lithium in the organic phase, a concentration of nickel in the cleaning solution decreased and a concentration of lithium increased. As the result, lithium was enriched in the cleaning solution.

TABLE 1

|  | Ni (g/L) | Li (g/L) |
| --- | --- | --- |
| Concentration of the cleaning solution before starting | 50.0 | 0 |
| Concentration of the cleaning solution after repeat using | 42.4 | 16.6 |

Example 2

Example of the Second Step (Separation Step of Nickel and Lithium from the Cleaning Solution)

The cleaning solution in which lithium was enriched were blended and agitated with a solvent in which neodecane acid (HEXION SPECIALTY CHEMICALS. Trade name: VA-10) was diluted to 25 vol % by a naphthene system agent (SHELL CHEMICALS. Trade name: shellsolD70) and nickel was extracted.

Figure 2:
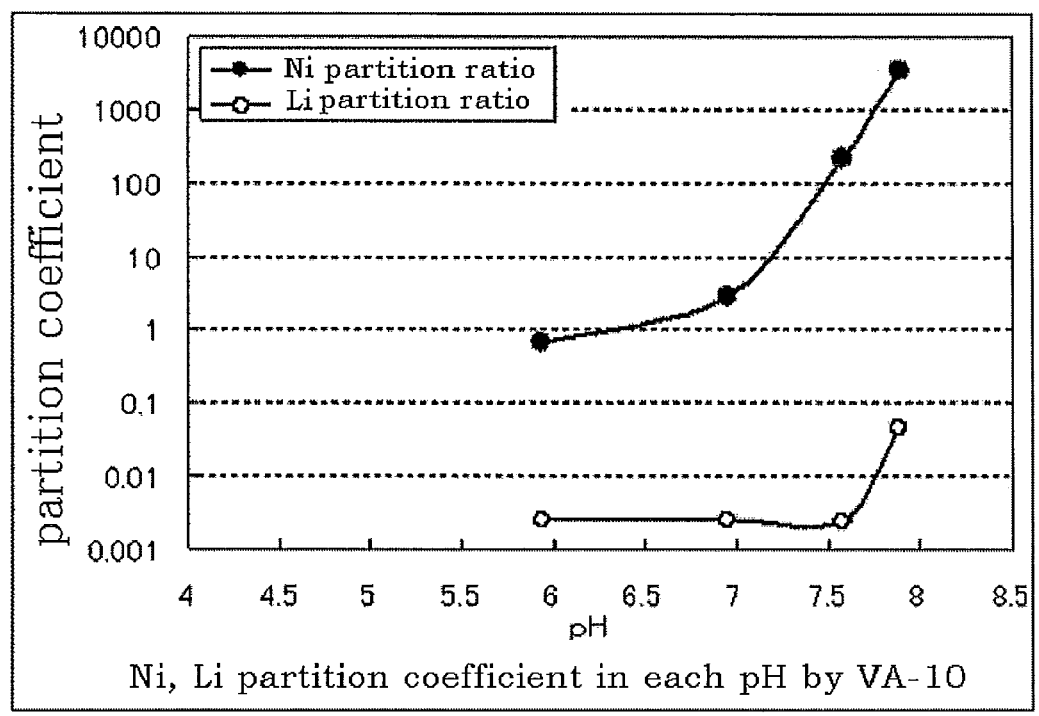
FIG. 2 indicates a partition coefficient of nickel and lithium to oil phase/aqueous phase in each of the extraction equilibrium pH of one embodiment of the present invention.

FIG. 2 indicates a partition coefficient of nickel and lithium to oil phase/aqueous phase in each of the extraction equilibrium. By the result, it is understood that nickel and lithium can be separated because nickel transfers to the organic phase and lithium remains in the aqueous phase at pH 6 to 8.

Table 2 indicates a result of analysis of the cleaning solution before and after separation of nickel.

TABLE 2

|  | Ni (g/L) | Li (g/L) |
|---|---|---|
| Before separation | 40.7 | 11.1 |
| After separation | 0.006 | 11.3 |

Example 3

Example of the Third Step (Neutralizing Step)

The cleaning solution after extracting nickel was controlled to pH 10 by ammonia water (the third step).

Example of the Fourth Step (Lithium Carbonation Step by Adding Sodium Carbonate)

Then sodium carbonate solution was added and lithium carbonate was produced. The produced lithium carbonate was filtrated, cleaned by hot water of 80° C. and then dried.

Table 3 indicates a result of analysis of the produced lithium carbonate elements. By the result, it is understood that the concentration of sodium in the produced lithium carbonate was maintained in a low level.

TABLE 3

|  | Li (mass %) | Ni (mass %) | Na (mass ppm) |
|---|---|---|---|
| composition of lithium carbonate | 18 | 0.14 | 580 |

Example 4

Example from the Fourth Step to the Fifth Step (Lithium Carbonation Step with Injecting Carbon Dioxide Gas and Cleaning Step for Lithium Carbonate with Hot Water)

The cleaning solution after extracting nickel provided in Example 2 was controlled to pH 10 by ammonia water. Then a carbon dioxide gas was injected at 100 mL/min for 5 hours and lithium carbonate was produced.

The pH in the solution decreased during injecting the carbon dioxide gas. Therefore, the pH was controlled to 8 to 10 by adding ammonia water accordingly. The produced lithium carbonate was filtrated, cleaned by hot water of 80° C. and then dried.

Table 4 indicates a result of analysis of the produced lithium carbonate elements by injecting the carbon dioxide gas. By the result, it is understood that the concentration of sodium in the lithium carbonate was maintained in a lower level than that in the lithium produced by sodium carbonate as a carbonation agent.

TABLE 4

|  | Li (mass %) | Ni (mass %) | Na (mass ppm) |
|---|---|---|---|
| composition of lithium carbonate | 18 | 0.14 | 300 |

Example 5

Example of the Fifth Step (a Case in which Hot Water is not Used for Cleaning Lithium Carbonate)

The cleaning solution after extracting nickel was controlled to pH 10 by ammonia water. Then a carbon dioxide gas was injected at 90 mL/min for 5 hours and lithium carbonate was produced. The pH was controlled to 8 to 10 by adding ammonia water accordingly during producing lithium carbonate.

The produced lithium carbonate was filtrated, cleaned by hot water of 25° C. and then dried.

Table 5 indicates a result of analysis of the produced lithium carbonate elements. By the result, it is understood that sodium cannot be removed sufficiently when ammonia water is used for controlling pH at the carbonation and hot water is not used for cleaning the produced lithium carbonate.

TABLE 5

|  | Li (mass %) | Ni (mass %) | Na (mass ppm) |
|---|---|---|---|
| composition of lithium carbonate | 18 | 0.16 | 680 |

Comparative Example 1

The cleaning solution after extracting nickel was controlled to Ph 10 by sodium hydrate. Then sodium carbonate aqueous solution was added and lithium carbonate was produced.

The lithium carbonate was dried without cleaning.

Table 6 indicates a result of analysis of the produced lithium carbonate elements. By the result, it is understood that sodium cannot be removed sufficiently when sodium hydrate is used for controlling pH at the carbonation and hot water cleaning is not conducted for the produced lithium carbonate.

TABLE 6

|  | Li (mass %) | Ni (mass %) | Na (mass ppm) |
|---|---|---|---|
| composition of lithium carbonate | 18 | 0.16 | 5800 |

Comparative Example 2

The cleaning solution after extracting nickel was controlled to pH 10 by sodium hydrate. Then sodium carbonate aqueous solution was added and lithium carbonate was produced.

The produced lithium carbonate was filtrated, cleaned by hot water of 80° C. and then dried.

Table 7 indicates a result of analysis of the produced lithium carbonate elements. By the result, it is understood that, when sodium hydrate is used for controlling pH at the carbonation, sodium cannot be removed sufficiently even if hot water cleaning is conducted for the produced lithium carbonate.

TABLE 7

|  | Li (mass %) | Ni (mass %) | Na (mass ppm) |
|---|---|---|---|
| composition of lithium carbonate | 18 | 0.16 | 2400 |

What is claimed is:

1. A preparation method of lithium carbonate, comprising:
   a first step of providing a cleaning solution, and extracting nickel and lithium into an organic phase by solvent extraction, cleaning the organic phase with a sulfuric acid cleaning solution containing nickel, wherein lithium in the organic phase is transferred to the sulfuric acid cleaning solution, thereby obtaining a post-cleaning solution where lithium is enriched;
   a second step of extracting residual nickel from the post-cleaning solution obtained in the first step by solvent extraction with an organic solvent from the post-cleaning solution, while controlling a pH of the post-cleaning solution by adding an alkaline agent; and
   a third step of precipitating and recovering lithium carbonate by injecting carbon dioxide gas or adding other carbonation agents, while controlling the pH of the post-cleaning solution by adding a second alkaline agent, thereby recovering lithium carbonate.

2. The preparation method of claim 1, further comprising a fourth step of cleaning the recovered lithium carbonate.

3. The preparation method of claim 1, wherein the organic solvent used in the second step is a carboxylic acid system extract agent.

4. The preparation method of claim 1, wherein an equilibrium pH of the post-cleaning solution in the first step is 2 to 4.

5. The preparation method of claim 1, wherein the pH of the post-cleaning solution in the third step is controlled to 8 to 11.

6. The preparation method of claim 2, wherein the lithium carbonate is cleaned at 60 to 95° C. in the fourth step.

7. The preparation method of claim 1, wherein a concentration of sodium in the recovered lithium carbonate is less or equal to 700 mass ppm.

8. The preparation method of claim 1, wherein the alkaline agent used in the second step is aqueous ammonia or lithium hydroxide.

* * * * *